Patented July 21, 1925.

1,546,902

UNITED STATES PATENT OFFICE.

JOHANNES M. KESSLER, OF WEST ORANGE, NEW JERSEY, ASSIGNOR TO E. I. DU PONT DE NEMOURS & COMPANY, OF WILMINGTON, DELAWARE, A CORPORATION OF DELAWARE.

PROCESS OF RECOVERING ACETIC ACID FROM CELLULOSE-ACETATE SOLUTIONS CONTAINING ACETIC ACID.

No Drawing. Application filed May 21, 1919. Serial No. 298,603.

*To all whom it may concern:*

Be it known that I, JOHANNES M. KESSLER, a citizen of the United States, and a resident of West Orange, in the county of Essex and State of New Jersey, have invented a certain new and useful Process of Recovering Acetic Acid from Cellulose-Acetate Solutions Containing Acetic Acid, of which the following is a specification.

This invention relates to the recovery of acetic acid from acetic acid solutions of cellulose acetate and particularly from crude solutions resulting from the acetylation of cellulose with acetic acid, acetic anhydride, and an acetylating catalyst. The new process comprises heating thin films of the solution to drive off acetic acid by evaporation, the solution having been subjected to a preparatory treatment prior to being spread in the form of a film.

In the handling of crude cellulose acetate solutions it has been customary to mix a relatively large volume of water with the solution to precipitate the cellulose acetate which is then isolated by filtering and washing. The acetic acid which results from this treatment is in a highly diluted condition and cannot be used again in the cellulose acetylation process until it has been concentrated. This concentration adds greatly to the expense of the process, especially in view of the large amounts of glacial acetic acid involved, about 8 parts of the acid being used to 1 part of cellulose.

The principal object of my invention is to provide a process of separating the acetic acid from the cellulose acetate which is in solution therein without diluting said acetic acid, or at least without diluting the same to the extent which is necessary to cause precipitation of cellulose acetate dissolved therein.

I have discovered that the acetic acid in the above described crude cellulose acetate solution may be readily recovered by first neutralizing the substance, usually sulfuric acid, which has been used as the acetylating catalyst, and then spreading the resulting solution on a heated surface to form a thin film from which the acetic acid may readily escape by evaporation. A moving heated surface such as a roller or moving belt is preferably used, such roller or belt being located in a closed chamber under atmospheric or reduced pressure. The vapors of acetic acid are recovered by condensation or by absorption in a suitable absorbent liquid.

The process may be illustrated by the following example, but it is to be understood that it is not limited thereto, since various changes in proportions and manipulations may be made without departing from the scope of my invention:

A crude cellulose acetate solution containing about 1,000 parts of acetic acid, about 160 parts of cellulose acetate, about 100 parts of water, and about 20 parts of sulfuric acid, is treated with about 36 parts of sodium acetate, that is a little more than enough to neutralize the sulfuric acid, until all the sulfuric acid has been converted into sodium sulfate. The resulting mixture is then allowed to flow on to a heated roller or casting wheel and withdrawn therefrom in the form of a cellulose acetate film substantially free from acetic acid.

The sodium sulfate remains in the film in the form of a precipitate and renders the film cloudy. The film is then washed and purified by prolonged soaking in water, or it may be cut into small pieces or shredded before being macerated. By this washing and soaking the sodium sulfate and any remaining acetic acid and sodium acetate is extracted. Since the cloudiness caused by the sodium sulfate renders the film unfit for use as such, it is a matter of indifference whether or not the casting wheel has a perfectly smooth surface or the film is of uniform thickness.

In order to recover the acetic acid vapors they may be drawn by suction or by a current of air through a condenser; or a body of air may be circulated in contact with the film on the heated surface and then in contact with a cold absorbent liquid to absorb the acetic acid vapors carried by the air. The absorbent liquid should have a boiling point substantially different from acetic acid so as to be easily separated therefrom by distillation.

I claim:

1. The process of separating acetic acid from a cellulose acetate solution containing acetic acid and an acid catalyst which comprises neutralizing the catalyst in said solution and then spreading the resulting mixture on a heated surface and subjecting the resulting film to the heat of said surface until at least a major part of the acetic acid in said film has evaporated.

2. The process of separating acetic acid from a cellulose acetate solution containing acetic acid and sulfuric acid which comprises neutralizing the sulfuric acid and then spreading the resulting mixture on a heated surface and subjecting the resulting film to the heat of said surface until at least a major part of the acetic acid in said film has evaporated.

3. The process which comprises neutralizing the sulfuric acid in a cellulose acetate solution containing acetic acid and sulfuric acid to form a metal sulfate therein, heating the thus treated solution in the form of a film to separate the acetic acid by evaporation, and then removing the metal sulfate from said film.

4. The process which comprises treating with a metal acetate a cellulose acetate solution containing acetic acid and sulfuric acid to form therein a water-soluble metal sulfate and acetic acid, heating the thus treated solution in the form of a film to separate the acetic acid by evaporation, and then treating said film with water to remove the metal sulfate.

5. The process which comprises treating with sodium acetate a cellulose acetate solution containing acetic acid and sulfuric acid to convert said sulfuric acid into sodium sulfate, spreading the thus treated solution on a moving heated surface, subjecting the resulting film to the heat of said surface until at least a major part of the acetic acid therein has evaporated, and then treating said film in suitably sub-divided form with water to remove the sodium sulfate therefrom.

6. The process of recovering acetic acid from a cellulose acetate solution containing acetic acid and sulfuric acid which comprises first neutralizing said sulfuric acid and then heating the thus treated solution sufficiently to evaporate acetic acid therefrom.

7. The process of recovering acetic acid from a cellulose acetate solution containing acetic acid and sulfuric acid which comprises first neutralizing said sulfuric acid with sodium acetate to form sodium sulfate and acetic acid and then heating the thus treated solution sufficiently to evaporate acetic acid therefrom.

In testimony whereof I affix my signature.

JOHANNES M. KESSLER.